US010650765B2

(12) United States Patent
Toko et al.

(10) Patent No.: US 10,650,765 B2
(45) Date of Patent: May 12, 2020

(54) LIQUID CRYSTAL ELEMENT AND LIGHTING APPARATUS

(71) Applicant: STANLEY ELECTRIC CO., LTD., Meguro-ku, Tokyo (JP)

(72) Inventors: Yasuo Toko, Tokyo (JP); Tomohide Mano, Tokyo (JP); Keisuke Kato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/232,278

(22) Filed: Dec. 26, 2018

(65) Prior Publication Data

US 2019/0206350 A1 Jul. 4, 2019

(30) Foreign Application Priority Data

Dec. 28, 2017 (JP) ................................ 2017-253741

(51) Int. Cl.
*G02F 1/1343* (2006.01)
*G02F 1/1345* (2006.01)
(Continued)

(52) U.S. Cl.
CPC ............ *G09G 3/3655* (2013.01); *F21S 41/60* (2018.01); *G02F 1/133528* (2013.01);
(Continued)

(58) Field of Classification Search
CPC .. G02F 1/1313; G02F 1/1345; G02F 1/13452; G02F 1/1333; G02F 1/134309;
(Continued)

(56) References Cited

U.S. PATENT DOCUMENTS

2004/0100676 A1 5/2004 Fanton et al.
2005/0168794 A1 8/2005 Fanton et al.
(Continued)

FOREIGN PATENT DOCUMENTS

JP 2005183327 A 7/2005
JP 6212218 B2 9/2017
WO 2015018729 A1 2/2015

OTHER PUBLICATIONS

Related U.S. Appl. No. 16/520,393 (Title: "Vehicular Lamp"; First Named Inventor: Yasuo Toko, filed Jul. 24, 2019).
(Continued)

*Primary Examiner* — Thoi V Duong
(74) *Attorney, Agent, or Firm* — Holtz, Holtz & Volek PC

(57) ABSTRACT

To improve the appearance of a light distribution pattern. A liquid crystal element having a first substrate, a second substrate, and a liquid crystal layer, where the first substrate has a counter electrode, where the second substrate includes inter-pixel electrodes, wiring parts, an insulating layer provided above the inter-pixel electrodes and the wiring parts, and pixel electrodes provided above the insulating layer, where the pixel electrodes are arranged along a first direction and a second direction, where the inter-pixel electrodes are arranged to at least overlap with a gap between the two pixel electrodes adjacent to each other in the first direction among the pixel electrodes and are connected to one of the two pixel electrodes through a through hole provided in the insulating layer, and where the wiring parts are connected to one of the inter-pixel electrodes and are arranged on the lower layer side of the pixel electrodes.

19 Claims, 10 Drawing Sheets

5

(51) Int. Cl.

| | |
|---|---|
| ***G02F 1/1337*** | (2006.01) |
| ***G09G 3/36*** | (2006.01) |
| ***F21S 41/60*** | (2018.01) |
| ***G02F 1/1335*** | (2006.01) |
| *F21S 41/64* | (2018.01) |
| *G02F 1/13* | (2006.01) |

(52) U.S. Cl.
CPC .. *G02F 1/133753* (2013.01); *G02F 1/134309* (2013.01); *G02F 1/134336* (2013.01); *F21S 41/645* (2018.01); *G02F 1/1313* (2013.01); *G02F 2203/48* (2013.01); *G09G 2300/0426* (2013.01)

(58) Field of Classification Search
CPC ......... G02F 1/136286; G02F 1/133707; G02F 1/133345; G02F 1/134336; G02F 1/1337; G02F 1/133711; G02F 1/136227; G02F 1/133753; G02F 1/133528; G02F 1/1343; G02F 1/155; G02F 2001/134345; G02F 2001/133757; G02F 2001/133357; G02F 2001/134372; G02F 2201/123; G02F 2201/121; G02F 2201/52; G02F 2201/12; G02F 2203/48; G09G 2300/0426; G09G 3/3655; F21S 41/60; F21S 41/645
See application file for complete search history.

(56) References Cited

U.S. PATENT DOCUMENTS

2007/0058123 A1* 3/2007 Um ...................... G02F 1/1343 349/144
2015/0252974 A1 9/2015 Hu

OTHER PUBLICATIONS

Extended European Search Report (EESR) dated Apr. 3, 2019, issued in counterpart European Application No. 18248296.8.

* cited by examiner

LIQUID CRYSTAL ELEMENT AND LIGHTING APPARATUS

BACKGROUND OF THE INVENTION

Field of the Invention

The present invention relates to an apparatus and a system for performing light irradiation in a desired pattern in front of an own vehicle for example, and a liquid crystal element suitable for use in the apparatus and the system.

Description of the Background Art

Japanese Unexamined Patent Application Publication No. 2005-183327 discloses a vehicular lamp comprising a light emitting part 11 including at least one LED 11*a* and a light shielding part 12 where a part of the light irradiated forward from the light emitting part is shielded forming a cutoff line suited for a light distribution pattern of the vehicular lamp. The light shielding part 12 consists of an electro-optical element having a dimming function and a control part 14 which performs light dimming control of the electro-optical element. The control part selectively performs a light dimming control by electrically switching the electro-optical element, thereby changing the shape of the light distribution pattern. A liquid crystal element is used as the electro-optical element, for example.

In the vehicular lamp as described above, the electro-optical element such as a liquid crystal element or the like is configured to have a plurality of pixel electrodes in order to achieve selective dimming. These pixel electrodes are separated from one another so as to be able to apply voltages individually, and a gap is provided between each of the pixel electrodes for electrical insulation. Here, the gap between the pixel electrodes is approximately 10 μm although it varies depending on the required forming precision. Further, in the case where three or more rows of pixel electrodes are provided, since it is necessary to extend a wiring part between the pixel electrodes for applying voltage to each pixel electrode in the middle row, the gap between the pixel electrodes eventually becomes larger. The gap between the pixel electrodes is a portion that does not contribute to the image formation and becomes a factor for generating a dark line in the light distribution pattern. In a vehicular lamp, since the image formed by the electro-optical element (the image corresponding to the light distribution pattern) is enlarged by the lens or the like and projected to the front of the own vehicle, the dark line as described above is also enlarged causing it to become conspicuous, thereby resulting in poor appearance in the light distribution pattern which is a disadvantage.

To overcome this disadvantage, narrowing the gap between the pixel electrodes may be considered. However, this option is not preferable because this would increase manufacturing cost and is likely to cause troubles such as a short circuit between the pixel electrodes. Further, to overcome this disadvantage, thinning the wiring part extended between the pixel electrodes may be considered. However, this option is not preferable because the increase in the resistance of the wiring part makes it difficult to apply necessary and sufficient voltage to the pixel electrode and disconnection occurrence probability increases due to the thinning of the wiring part. Here, such disadvantages are not limited to a vehicle lamp and is likely to occur in a lighting apparatus in general that controls light distribution patterns using a liquid crystal element or the like.

In a specific aspect, it is an object of the present invention to provide a technique capable of improving the appearance of a light distribution pattern in a lighting apparatus that controls the light distribution pattern using liquid crystal elements or the like.

SUMMARY OF THE INVENTION

[1] A liquid crystal element according to one aspect of the present invention includes (a) a first substrate and a second substrate disposed facing each other, and a liquid crystal layer disposed between the first substrate and the second substrate, where (b) the first substrate has a counter electrode provided on its one surface side, where (c) the second substrate includes a plurality of inter-pixel electrodes and a plurality of wiring parts provided on its one surface side, an insulating layer provided above the plurality of inter-pixel electrodes and the plurality of wiring parts, and a plurality of pixel electrodes provided above the insulating layer, where (d) the plurality of pixel electrodes is arranged along a first direction and a second direction intersecting the first direction in plan view, where (e) each of the plurality of inter-pixel electrodes is arranged, in plan view, so as to at least overlap with a gap between the two pixel electrodes adjacent to each other in the first direction among the plurality of pixel electrodes, and is connected to one of the two pixel electrodes through a through hole provided in the insulating layer, and where (f) each of the plurality of wiring parts is connected to one of the plurality of inter-pixel electrodes and is arranged on the lower layer side of the plurality of pixel electrodes.

[2] A lighting apparatus according to one aspect of the present invention is (a) a lighting apparatus capable of variably setting a light distribution pattern including (b) a light source; (c) a liquid crystal element for forming an image corresponding to the light distribution pattern using light from the light source, and (d) an optical system for projecting the image formed by the liquid crystal element, where (e) the liquid crystal element described in the above-stated paragraph [1] is used as the liquid crystal element.

According to each of the configurations described above, it is possible to improve the appearance of a light distribution pattern in a lighting apparatus that controls the light distribution pattern using liquid crystal elements or the like.

DESCRIPTION OF THE PREFERRED EMBODIMENTS

Figure 1:
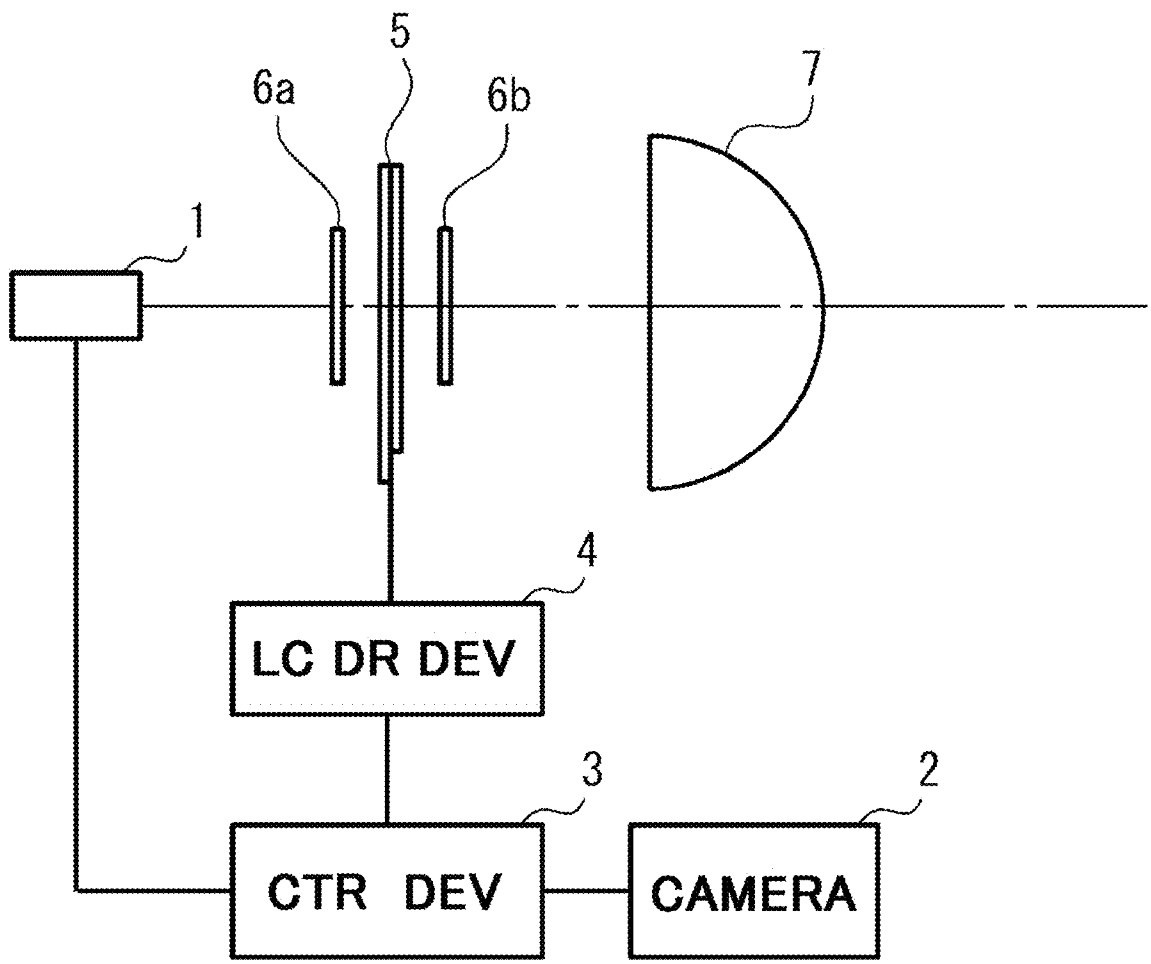
FIG. 1 is a diagram showing the configuration of a vehicular lamp system according to one embodiment.

FIG. 1 is a diagram showing the configuration of a vehicular lamp system according to one embodiment. The vehicular lamp system shown in FIG. 1 is configured to include a light source 1, a camera 2, a control device 3 (which is abbreviated as CTR DEV in FIG. 1), a liquid crystal driving device 4 (which is abbreviated as LC DR DEV in FIG. 1), a liquid crystal element 5, a pair of polarizers 6*a* and 6*b*, and a projection lens 7. The vehicular lamp system detects the position of a preceding vehicle or a pedestrian or the like existing around one's own vehicle based on the image captured by the camera 2, sets a predetermined region including the position of a preceding vehicle or the like as the non-irradiation region, and sets the remaining region as the light irradiation region and selectively irradiates light thereafter.

The light source 1 includes, for example, a white light LED configured by combining a yellow phosphor in a light emitting element (LED) that emits blue light. The light source 1 includes, for example, a plurality of white light LED arranged in a matrix or in a line. Here, instead of the above-stated LED, light source commonly used in a lamp unit for vehicles such as a laser, a light bulb or a discharge lamp can be used for the light source 1. The on/off state of the light source 1 is controlled by a control device 3. The light emitted from the light source 1 is made incident on the liquid crystal element 5 (the liquid crystal panel) via the polarizer 6*a*. Note that another optical system, for example, a lens, a reflecting mirror, or a combination thereof, may exist on the path from the light source 1 to the liquid crystal element 5.

The camera 2 is for photographing the front of its own vehicle and outputting its image (information), and is installed at a predetermined position (for example, the upper portion of the front windshield) inside the vehicle. Here, note that if the own vehicle is equipped with a camera for other purposes (for example, an automatic braking system or the like), the camera may be shared.

The control device 3 detects the position of the forward vehicle or the like by performing image processing based on the image obtained by the camera 2 photographing the front of the vehicle. The control device 3 then sets a light distribution pattern where the the position (area) of the detected forward vehicle or the like is defined as the non-irradiation range and the remaining area is defined as the irradiation range. The control device 3 then generates a control signal for forming an image corresponding to the light distribution pattern and supplies it to the liquid crystal driving device 4. The control device 3 carries out a predetermined operation program in a computer system comprising a CPU, ROM, RAM and the like, for example.

The liquid crystal driving device 4 supplies a driving voltage to the liquid crystal element 5 based on the control signal supplied from the control device 3, thereby individually controlling the alignment state of the liquid crystal layer in each pixel region of the liquid crystal element 5.

The liquid crystal element 5 has, for example, a plurality of individually controllable pixel regions (light modulating regions), and the transmittance of each pixel region is variably set according to the magnitude of the voltage applied to the liquid crystal layer provided by the liquid crystal driving device 4. By transmitting light from the light source 1 to the liquid crystal element 5, the image having brightness and darkness corresponding to the light irradiation range and the non-irradiation range described above is formed. For example, the liquid crystal element 5 is provided with a vertical alignment type liquid crystal layer and is disposed between the pair of polarizers 6*a* and 6*b* arranged in crossed Nicol arrangement. The liquid crystal element 5 is set in a state in which the light transmittance is extremely low (light shielding state) when the voltage to the liquid crystal layer is not applied (or a voltage is equal to or lower than a threshold value) and is set in a state in which the light transmittance is relatively high (transmission state) when the voltage is applied to the liquid crystal layer.

The polarizing axes of the pair of polarizers 6*a* and 6*b* are substantially orthogonal to each other, for example, and are arranged to face each other with the liquid crystal element 5 interposed therebetween. In this embodiment, the liquid crystal element is assumed to be set in a state where light is shielded (the light transmittance is extremely low) when no voltage is applied to the liquid crystal layer, which is so-called a normally black mode type liquid crystal element. For each of the polarizers 6*a* and 6*b*, an absorptive polarizer made of a general organic material (iodine type, dye type) can be used, for example. Further, if heat resistance is highly desired, it is also preferable to use a wire grid polarizer. A wire grid polarizer is a polarizer in which ultra thin lines (wires) made of metal such as aluminum are arranged in an array. Further, an absorptive polarizer and a wire grid polarizer may be stacked and used.

The projection lens 7 enlarges the image formed by the light transmitted through the liquid crystal element 5 (the image having light and dark portions each corresponding to the light irradiation range and the non-irradiation range) so as to provide light distribution suited for a headlight and projects the image forward of the own vehicle, and a suitably designed lens is used in the system to achieve its purpose. In this embodiment, a projector lens which forms an inverted image is used.

Figure 2A:
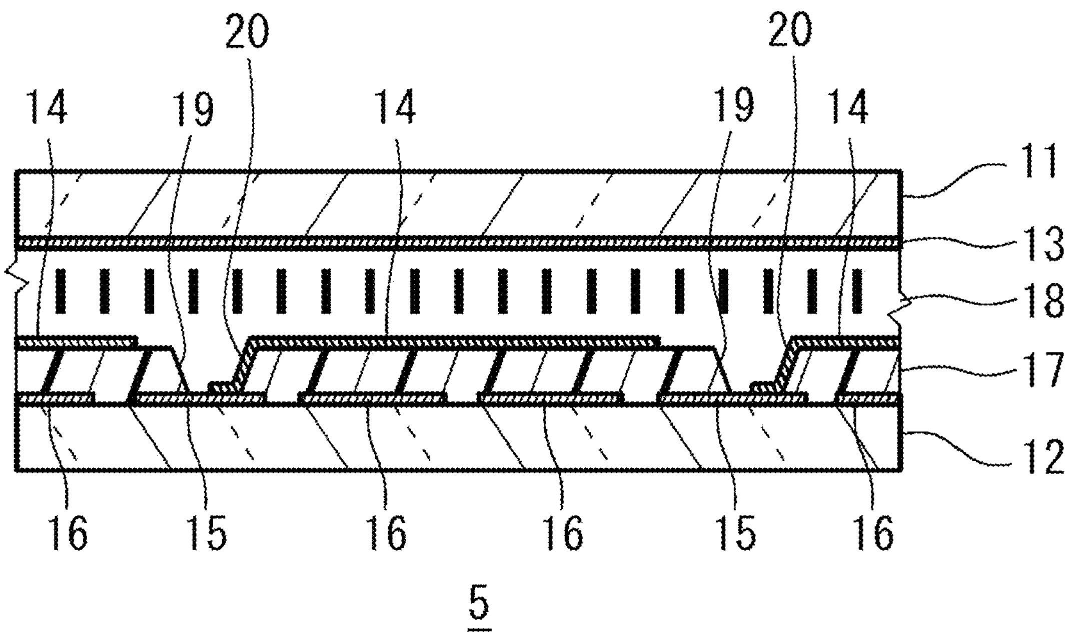
FIGS. 2A and 2B are schematic cross-sectional views showing the configuration of the liquid crystal element.
Figure 2B:
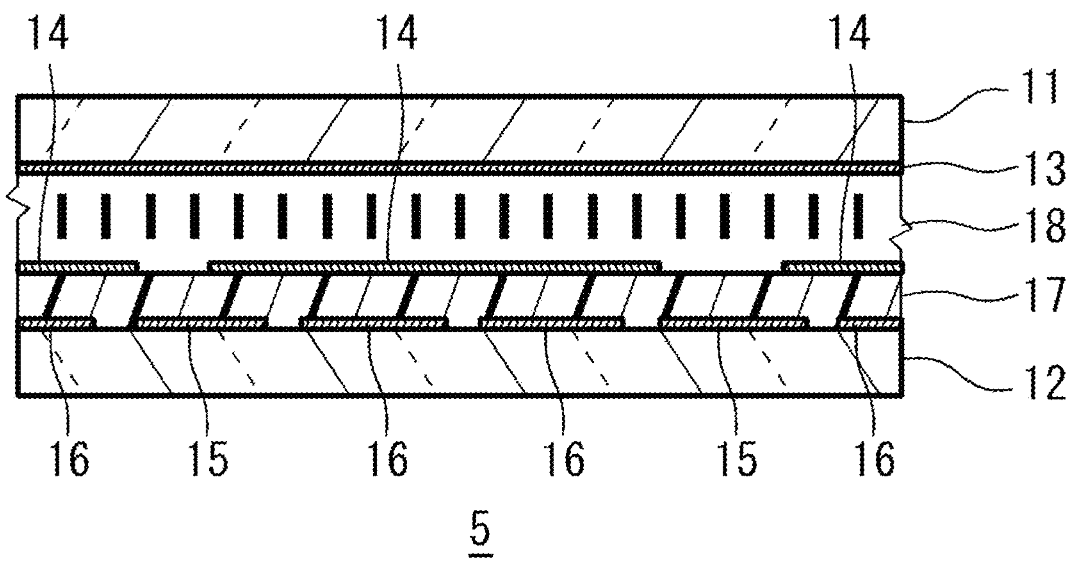
Figure 3:
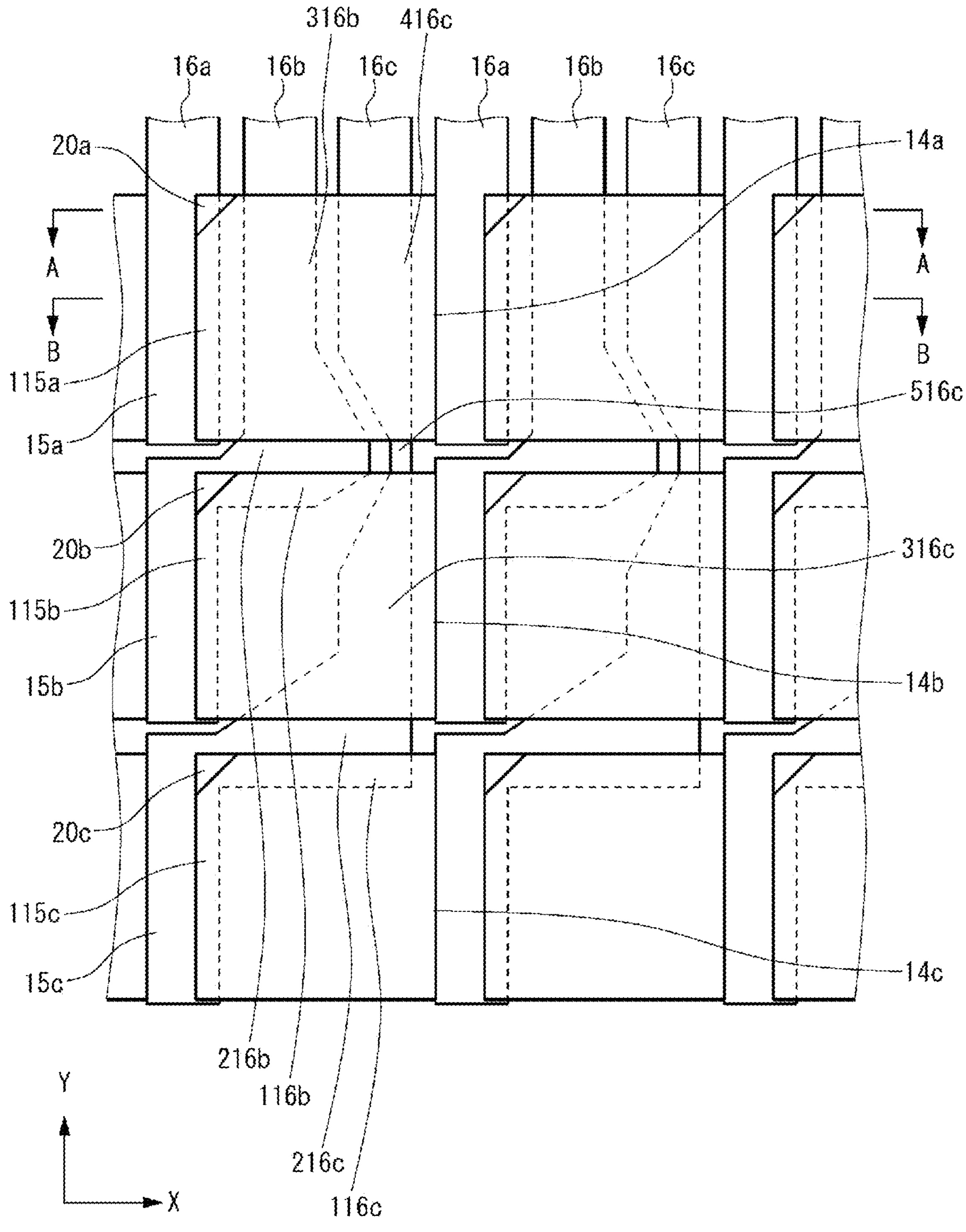
FIG. 3 is a schematic plan view showing the configuration of the liquid crystal element.

FIGS. 2A and 2B are schematic cross-sectional views showing the configuration of the liquid crystal element. And FIG. 3 is a schematic plan view showing the configuration of the liquid crystal element. Here, the cross sectional view shown in FIG. 2A corresponds to the partial cross section taken along line A-A shown in FIG. 3 and the cross sectional view shown in FIG. 2B corresponds to the partial cross section taken along line B-B shown in FIG. 3 The liquid crystal element 5 is configured to include an upper substrate (first substrate) 11 and a lower substrate (second substrate) 12 arranged to face each other, a common electrode (counter electrode) 13 provided on the upper substrate 11, a plurality of pixel electrodes 14 (14*a*, 14*b*, 14*c*) provided on the lower substrate 12, a plurality of inter-pixel electrodes 15 (15*a*, 15*b*, 15*c*), a plurality of wiring parts 16 (16*a*, 16*b*, 16C), an insulating layer 17, and a liquid crystal layer 18 disposed between the upper substrate 11 and the lower substrate 12. Here, although not shown for convenience of explanation, an alignment film for regulating the alignment of the liquid crystal layer 18 is suitably provided on the upper substrate 11 and the lower substrate 12, respectively.

Each of the upper substrate 11 and the lower substrate 12 is a rectangular substrate in a plan view and are arranged to face each other. As each substrate, for example, a transparent substrate such as a glass substrate, a plastic substrate or the like can be used. A plurality of spacers is dispersed uniformly and arranged between the upper substrate 11 and the lower substrate 12, for example, and as a result of these spacers, a predetermined gap (approximately a few μm, for example) is maintained between the two substrates.

The common electrode 13 is provided on one surface side of the upper substrate 11. The common electrode 13 is integrally provided so as to face each pixel electrode 14 of the lower substrate 12. The common electrode 13 is configured, for example, by suitably patterning a transparent conductive film made of indium tin oxide (ITO) or the like.

Figure 4:
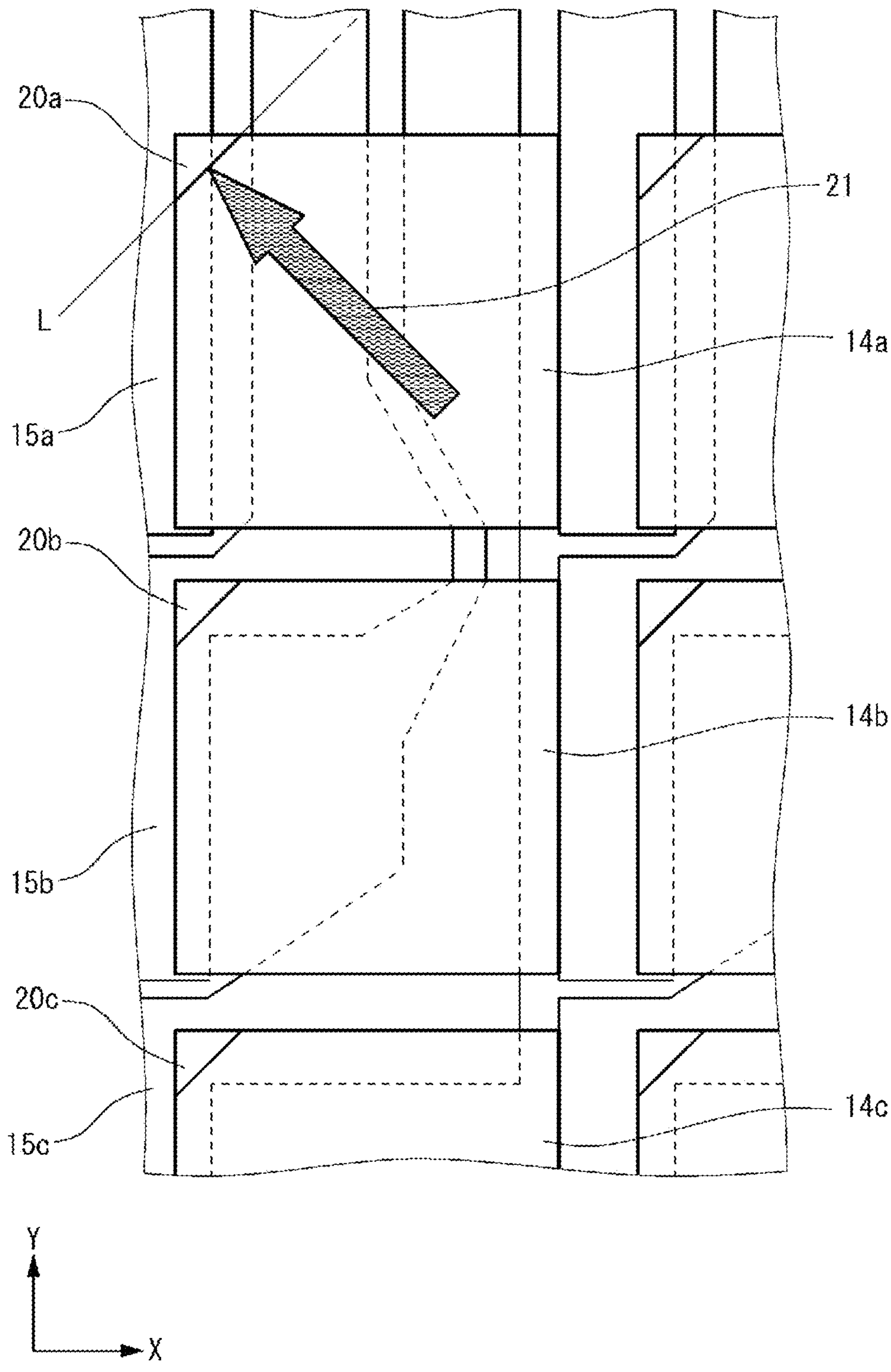
FIG. 4 is a diagram for explaining the relationship between the shape of the connecting part of each pixel electrode and the direction of alignment treatment.

The plurality of pixel electrodes 14 (14*a*, 14*b*, 14*c*) is provided on one surface side of the lower substrate 12 and on the upper side of the insulating layer 17. These pixel electrodes 14 (14*a*, 14*b*, 14*c*) are configured, for example, by suitably patterning a transparent conductive films made of indium tin oxide (ITO) or the like. As shown in FIG. 4, each pixel electrode 14 has, for example, a rectangular outer edge shape in a plan view, and is arranged in a matrix along the x direction and the y direction. A gap is provided between each pixel electrode 14. Each of the regions where the common electrode 13 and each pixel electrode 14 overlap constitutes the above-described pixel region (light modulation region).

The plurality of inter-pixel electrodes 15 (15*a*, 15*b*, 15*c*) is provided on one surface side of the lower substrate 12 and on the lower layer side of the insulating layer 17. These inter-pixel electrodes 15 (15*a*, 15*b*, 15*c*) are configured, for example, by suitably patterning a transparent conductive films made of indium tin oxide (ITO) or the like. As shown in FIG. 4, for example, each of the inter-pixel electrode 15 (15*a*, 15*b*, 15*c*) has a rectangular outer edge shape in a plan view and overlaps the gap between the two pixel electrodes 14 (14*a*, 14*b*, 14*c*) adjacent to each other in the x direction in the figure.

The plurality of wiring parts 16 (16*a*, 16*b*, 16C) is provided on one surface side of the lower substrate 12 and on the lower layer side of the insulating layer 17. These wiring parts 16 (16*a*, 16*b*, 16C) are configured, for example, by suitably patterning a transparent conductive films made of indium tin oxide (ITO) or the like. A voltage is applied from the liquid crystal driving device 4 to each of the pixel electrodes 14 (14*a*, 14*b*, 14*c*) via each of the wiring parts 16 (16*a*, 16*b*, 16C).

The insulating layer 17 is provided on one surface side of the lower substrate 12 so as to cover the upper side of the inter-pixel electrodes 15 (15*a*, 15*b*, 15*c*) and the wiring parts 16 (16*a*, 16*b*, 16C). The insulating layer 17 is, for example, a $SiO_2$ film or a SiON film and can be formed by a gas phase process such as a sputtering method or a solution process. An organic insulating film may also be used for the insulating layer 17.

The liquid crystal layer 18 is provided between the upper substrate 11 and the lower substrate 12. In the present embodiment, the liquid crystal layer 18 is formed using a nematic liquid crystal material having a negative dielectric anisotropy Δ≥, including a chiral material and having fluidity. In the liquid crystal layer 18 of this embodiment, the alignment of the liquid crystal molecules when no voltage is applied is in a state inclined in one direction, and has a pretilt angle within the range of 88° or more and less than 90° with respect to each substrate surface and are set to be substantially vertically aligned, for example.

As described above, an alignment film is provided on one surface side of the upper substrate 11 and the lower substrate 12, respectively. As each of the alignment films, a vertical alignment film that regulates the alignment of the liquid crystal layer 18 vertically is used. Each alignment film is subjected to a uniaxial alignment treatment such as a rubbing treatment and has a uniaxial alignment regulating force that regulates the alignment of the liquid crystal molecules of the liquid crystal layer 18 in one direction. The alignment treatment direction of the respective alignment films is set so as to be staggered (anti-parallel), for example.

The liquid crystal element 5 of the present embodiment has several tens of pixel regions to several hundreds of pixel regions defined as regions where the common electrode 13 and each pixel electrode 14 (14*a*, 14*b*, 14*c*) overlap in plan view, and these pixel regions are arranged in a matrix. In this embodiment, although the shape of each pixel region is a square, the shape of the pixel regions can be arbitrarily set, such as a mixture of rectangular shapes and squares, for example. The common electrode 13, the pixel electrodes 14 (14*a*, 14*b*, 14*c*), and the inter-pixel electrodes 15 (15*a*, 15*b*, 15*c*) are connected to the liquid crystal driving device 4 via the respective wiring parts 16 (16*a*, 16*b*, 16C), etc., and are statically driven.

Referring again to FIG. 3, the structure of each pixel electrode 14 (14*a*, 14*b*, 14*c*), each inter-pixel electrode 15 (15*a*, 15*b*, 15*c*), and each wiring part 16 (16*a*, 16*b*, 16C) will be described in detail. In the present embodiment, the pixel electrodes 14 (14*a*, 14*b*, 14*c*) are arranged in three rows along the y direction (the vertical direction), and arbitrary numbers of the pixel electrodes 14 (14*a*, 14*b*, 14*c*) are arranged along the x direction (the horizontal direction). Here, with respect to each pixel electrode 14 (14*a*, 14*b*, 14*c*), in order from the top in the figure, the pixel electrode in the first row is referred to as pixel electrode 14*a*, the pixel electrode in the second row is referred to as pixel electrode 14*b*, and the pixel electrode in the third row is referred to as pixel electrode 14*c*. Further, with respect to the inter-pixel electrode 15 (15*a*, 15*b*, 15*c*), the one corresponding to the pixel electrode 14*a* in the first row is referred to as inter-pixel electrode 15*a*, the one corresponding to the pixel electrode 14*b* in the second row is referred to as inter-pixel electrode 15*b*, and the one corresponding to the pixel electrode 14*c* in the third row is referred to as inter-pixel electrode 15*c*. Further, with respect to the wiring part 16 (16*a*, 16*b*, 16C), the one corresponding to the pixel electrode 14*a* and the inter-pixel electrode 15*a* in the first row is referred to as the wiring part 16*a*, the one corresponding to the pixel electrode 14*b* and the inter-pixel electrode 15*b* in the second row is referred to as the wiring part 16*b*, and the one corresponding to the pixel electrode 14*c* and the inter-pixel electrode 15*c* in the third row is referred to as the wiring part 16*c*.

Each pixel electrode 14*a* is connected to the inter-pixel electrode 15*a* and the wiring part 16*a* on the lower layer side via a through hole 19 provided in the insulating layer 17. Thus, the pixel electrode 14*a*, the inter-pixel electrode 15*a*, and the wiring part 16*a* have the same electrical potential. Each through hole 19 has a substantially triangular outer edge shape in plan view, and corresponds to one of the four corners (top left corner in the figure) of each pixel electrode 14*a*. And each pixel electrode 14*a* has a connecting part 20*a* formed along the wall surface of the through hole 19. The connecting part 20*a* is connected to the inter-pixel electrode 15*a* and the portion of the wiring part 16*a* exposed at the bottom of the through hole 19 on the lower layer side.

Similarly, each pixel electrode 14*b* has a connecting part 20*b* formed along the wall surface of the through hole 19, and is connected to the inter-pixel electrode 15*b* and the wiring part 16*b* on the lower layer side. Thus, the pixel electrode 14*b*, the inter-pixel electrode 15*b*, and the wiring part 16*b* have the same electrical potential. Similarly, each pixel electrode 14*c* has a connecting part 20*c* formed along the wall surface of the through hole 19, and is connected to the inter-pixel electrode 15*c* and the wiring part 16*c* on the lower layer side. Thus, the pixel electrode 14*c*, the inter-pixel electrode 15*c*, and the wiring part 16*c* have the same electrical potential.

Each of the inter-pixel electrodes 15*a* is disposed, in plan view, so as to fill the space between the two adjacent pixel electrodes 14*a* in the x direction. In the present embodiment, each of the inter-pixel electrodes 15*a* is disposed so that its own left outer edge in plan view and the right outer edge of the pixel electrode 14*a* arranged on the left side thereof are substantially at the same position in the vertical direction.

Further, each of the inter-pixel electrodes 15*a* is disposed, in plan view, so that a partial region (first region) 115*a* located inward from its own right edge partly overlaps with a part of the region in the vicinity of the left outer edge of the pixel electrode 14*a* arranged on the right side thereof. In these partial regions 115*a*, an oblique electric field is prevented from occurring in the vicinity of the left outer edge of the pixel electrode 14*a* in the figure thereby achieving the effect of suppressing the occurrence of dark region. Thus, it is preferable that the length of each partial region 115*a* in the y direction is set as large as possible, and thus, in the present embodiment, the length of the partial region 115*a* in the y direction is set to be substantially the same as the length of the corresponding pixel electrode 14*a* in the y direction.

Similarly, each of the inter-pixel electrodes 15*b* is disposed, in plan view, between two adjacent pixel electrodes 14*b* arranged in the x direction, and a partial region (first region) 115*b* partially overlaps with the pixel electrode 14*b* on the right side thereof. Similarly, each of the inter-pixel electrodes 15*c* is disposed, in plan view, between two adjacent pixel electrodes 14*c* arranged in the x direction, and a partial region (first region) 115*c* partially overlaps with the pixel electrode 14*c* on the right side thereof.

Here, in the figure, the lower end portions of the inter-pixel electrodes 15*a*, 15*b*, 15*c* are drawn so as to protrude slightly downward from the lower end portions of the respective pixel electrodes 14*a*, 14*b*, 14*c*, but the lower end portions may actually be aligned.

Each wiring part 16*a* is connected to one of the inter-pixel electrodes 15*a* and extends upward in the figure. In the present embodiment, each wiring part 16*a* is integrally formed with the corresponding inter-pixel electrode 15*a* sharing the same width. Each wiring part 16*a* is connected to the liquid crystal driving device 4.

Each wiring part 16*b* is connected to one of the inter-pixel electrodes 15*b* and extends upward in the figure. Each wiring part 16*b* is connected to the liquid crystal driving device 4. In the present embodiment, each wiring part 16*b* has, in plan view, (i) a partial region (second region) 116*b* partially overlapping the pixel electrode 14*b* adjacent in the x direction with respect to the inter-pixel electrode 15*b* connected to the wiring part 16*b*, (ii) a partial region (third region) 216*b* disposed between the pixel electrode 14*b* and the pixel electrode 14*a* adjacent thereto in the y direction, and (iii) a partial region 316*b* overlapping with the pixel electrode 14*a*. The partial regions 116*b*, 216*b*, 316*b* are integrally formed.

Each partial region 116*b* of each wiring part 16*b* has an effect of suppressing the occurrence of a dark region near the upper outer edge of the pixel electrode 14*b* in the figure, similar to the partial region 115*b* described above. Thus, it is preferable that the width of each partial region 116*b* in the x direction is set as wide as possible, and it is preferable to have a width of 50% or more with respect to the width of the corresponding pixel electrodes 14*a* or 14*b*, for example. In the illustrated example, the width of each partial region 216*b* is about 70% of the width of the corresponding pixel electrodes 14*a* or 14*b*.

Each partial region 216*b* of each wiring part 16*b* also functions as an inter-pixel electrode arranged between the two adjacent pixel electrodes 14*a* and 14*b* in the y direction. Thus, it is preferable that the x direction length of each partial region 216*b* is set as wide as possible, and it is preferable to have a length of 50% or more with respect to the length of the corresponding pixel electrodes 14*a* or 14*b* in the x direction, for example. In the illustrated example, the width of each partial region 216*b* is about 70% of the length of the corresponding pixel electrodes 14*a* or 14*b* in the x direction. By providing such a partial region 216*b*, it is possible to broaden a region substantially functioning as a pixel region.

Each wiring part 16*c* is connected to one of the inter-pixel electrodes 15*c* and extends upward in the figure. Each wiring part 16*c* is connected to the liquid crystal driving device 4. In the present embodiment, each wiring part 16*c* has, in plan view, (i) a partial region (a second region) 116*c* partially overlapping the pixel electrode 14*c* adjacent in the x direction with respect to the inter-pixel electrode 15*c* connected to the wiring part 16*c*, (ii) a partial region (a third region) 216*c* disposed between the pixel electrode 14*c* and the pixel electrode 14*b* adjacent thereto in they direction, (iii) a partial region 316*c* disposed to overlap with the pixel electrode 14*b* and interposing the insulating layer 17 therebetween, (iv) a partial region 416*c* disposed to overlap with the pixel electrode 14*a* adjacent to the pixel electrode 14*b* in the y direction and interposing the insulating layer 17 therebetween, and (v) a connection region 516*c* connecting the partial region 316*c* and the partial region 416*c* disposed between the pixel electrode 14*a* and the pixel electrode 14*b*. The partial regions 116*c*, 216*c*, 316*c*, 416*c*, and the connection region 516*c* are integrally formed.

Each partial region 116*c* of each wiring part 16*c* has an effect of suppressing the occurrence of a dark region near the upper outer edge of the pixel electrode 14*c* in the figure, similar to the partial region 115*c* described above. Thus, it is preferable that the length of each partial region 116*c* in the x direction is set as wide as possible, and for example, it is preferable to have a length of 50% or more with respect to the length of the corresponding pixel electrodes 14*b* or 14*c* in the x direction. In the illustrated example, the length of each partial region 116*c* is about 87% of the length of the corresponding pixel electrodes 14*b* or 14*c* in the x direction.

Each partial region 216*c* of each wiring part 16*c* also functions as an inter-pixel electrode arranged between the two adjacent pixel electrodes 14*b* and 14*c* in the y direction. Thus, it is preferable that the length of each partial region 216*c* in the x direction is set as wide as possible, and it is preferable to have a length of 50% or more with respect to the length of the corresponding pixel electrodes 14*b* or 14*c* in the x direction, for example. In the illustrated example, the length of each partial region 216*c* is about 87% of the length of the corresponding pixel electrodes 14*b* or 14*c* in the x direction. By providing such a partial region 216*c*, it is possible to widen a region that substantially functions as a pixel region.

FIG. 4 is a diagram for explaining the relationship between the shape of the connecting part of each pixel electrode and the direction of alignment treatment. Similar to FIG. 3, in FIG. 4, each pixel electrode, etc. is shown in a plan view. Here, the alignment treatment is defined as a treatment (uniaxial alignment treatment) for imparting an alignment regulating force (uniaxial alignment regulating force) in one direction to an alignment film, such as a rubbing treatment or a photo aligning treatment. And the direction of alignment treatment is defined as the direction at the time of performing the above-described alignment treatment, and in general, coincides with the direction in which the uniaxial alignment regulating force is generated. As described above, the through hole 19 in which the connecting part 20*a* of each pixel electrode 14*a* is provided has a substantially triangular outer edge. In the present embodiment, the direction L of the outer edge of the connecting part 20*a* disposed to intersect with both the left outer edge and the upper outer edge of the pixel electrode 14*a* forms an angle of approximately 45 degrees with respect to both the x and y directions. The direction of alignment treatment 21 intersects (substantially orthogonal in the present embodiment) with the direction L of the outer edge, and is set from the inside of the pixel electrode 14*a* toward the outer edge of the connecting part 20*a*. Here, the relationship between each of the connecting parts 20*b*, 20*c* of each of the pixel electrode 14*b*, 14*c* and the direction of alignment treatment 21 is the same as above. The reason why it is preferable to set the direction of alignment treatment 21 as such will now be described.

Figure 5A:
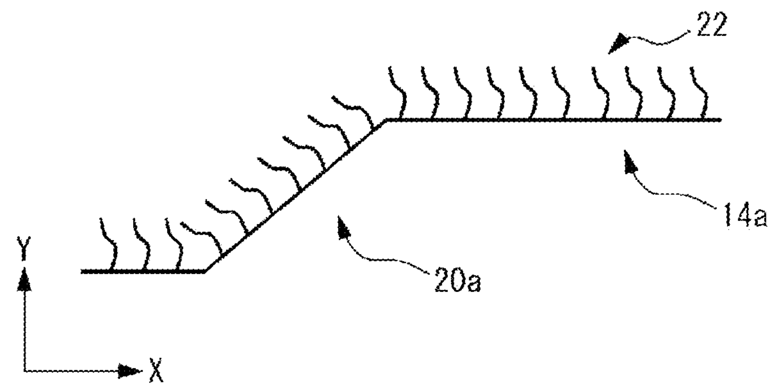
FIGS. 5A to 5C are diagrams for explaining the relationship between each connecting part and the direction of alignment treatment.
Figure 5B:
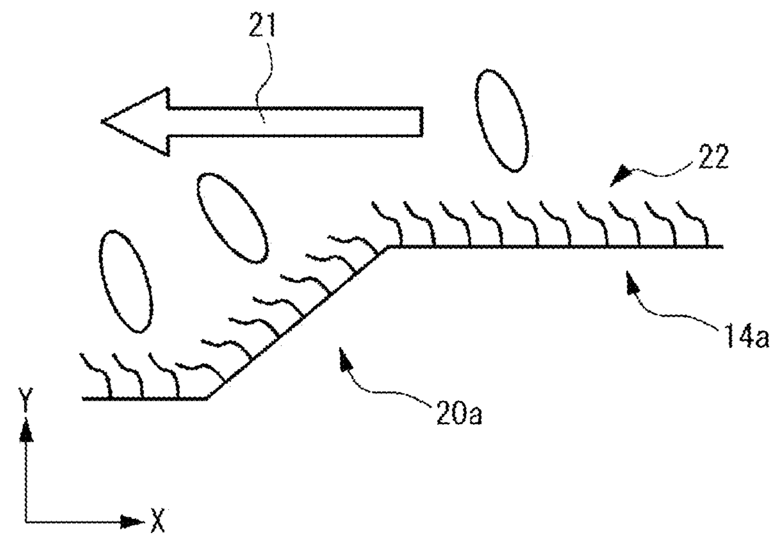
Figure 5C:
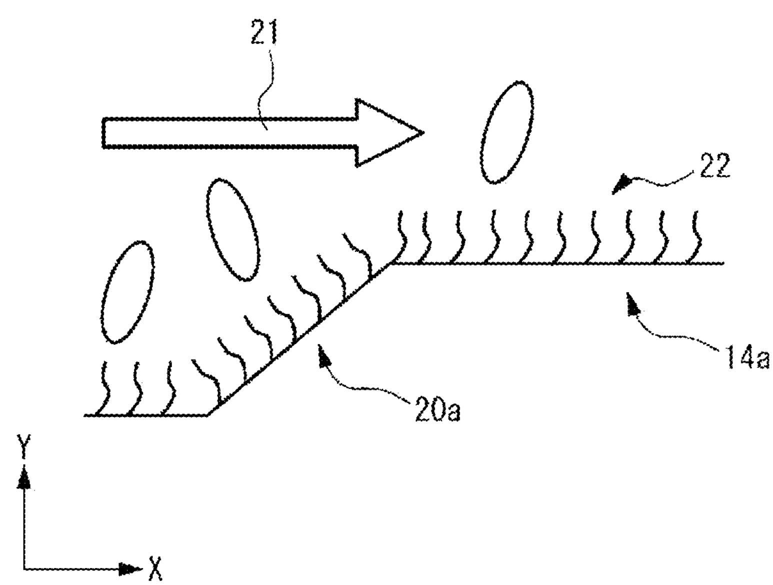

FIGS. 5A to 5C are diagrams for explaining the relationship between each connecting part and the direction of alignment treatment. The state of the alignment film on the connecting part of each pixel electrode and the surface in the vicinity thereof is schematically shown. FIG. 5A shows a state before the alignment treatment is being performed. As shown in the figure, in the connecting part 20*a* and the vicinity thereof, for example, side chain 22 of the alignment film rises perpendicularly from the surface. At this time, since the rising direction of the side chain 22 changes according to the surface configuration, the side chain 22 rises perpendicularly from the sloped surface area along the through hole 19 of the connecting part 20*a*.

FIG. 5B shows the state of the alignment film when alignment treatment (rubbing treatment) is performed by setting the direction of alignment treatment 21 to the preferable state as shown in FIG. 4. In this case, since the alignment treatment is performed in the direction from the right to the left in the figure, the side chain 22 also tilts somewhat in that direction. Here, when viewing the y direction in the figure as the reference direction (the vertical direction), since the side chain 22 is inclined to the left side in the figure throughout the whole region, the alignment direction of the liquid layer molecules controlled by the side chain 22 is also inclined to the left side in the figure. Thus, occurrence of a disclination line in the vicinity of the connecting part 20*a* can be prevented.

FIG. 5C is a comparative example showing the state of the alignment film when alignment treatment (rubbing treatment) is performed by setting the direction of alignment treatment 21 in the direction opposite to the preferable state shown in FIG. 4. In this case, since the alignment treatment is performed in the direction from the left to the right in the figure, the side chain 22 also tilts somewhat in that direction. Here, when viewing the y direction in the figure as the reference direction (the vertical direction), the side chain 22 is inclined to the right in the figure in the flat surface portion of the pixel electrode 14*a*, whereas in the sloped surface portion of the connecting part 20*a*, the side chain remains inclined to the left side in the figure. Thus, the alignment direction of the liquid crystal molecules is reversed in the vicinity of the connecting part 20*a* and its periphery, and a disclination line is formed at the boundary. The occurrence of such a disclination line leads to deterioration of the quality of the formed light distribution pattern.

Figure 6:
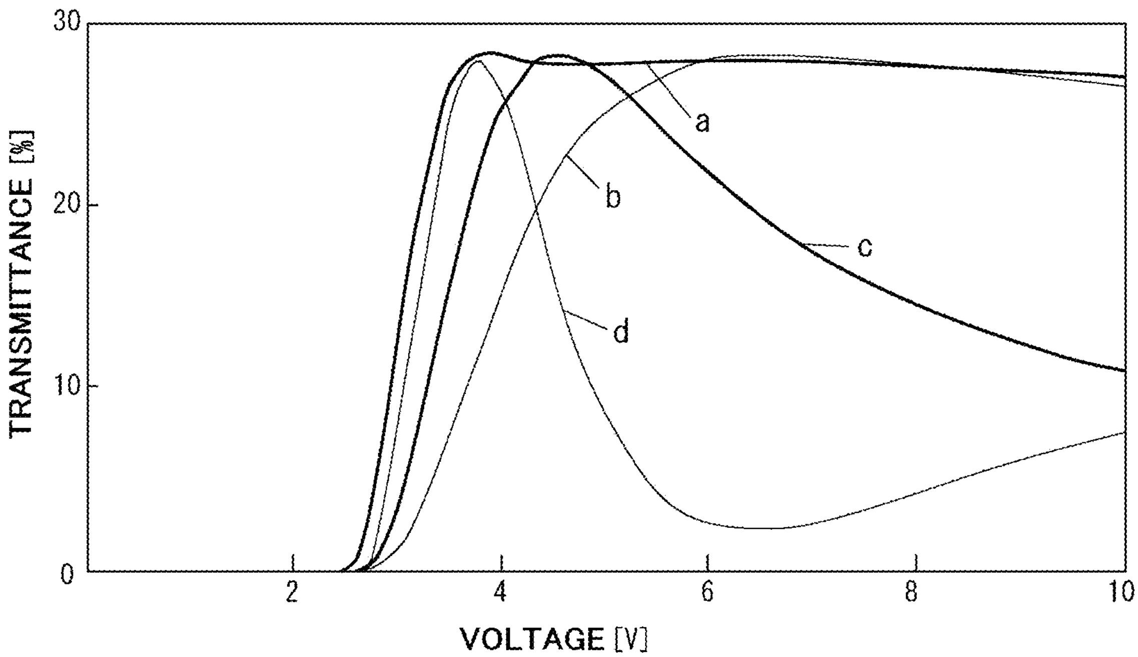
FIG. 6 is a graph showing the transmittance characteristics of each sample of the liquid crystal element.

FIG. 6 is a graph showing the transmittance characteristics of several samples of the liquid crystal element. Here, the transmittance characteristics of several samples of the liquid crystal elements were measured where various conditions other than the cell thickness and the presence or absence of the addition of chiral material to the liquid material were made common. And the pair of polarizers were arranged and prepared as described above. Regarding the vertical alignment film, one having a rigid skeleton (liquid crystal type) in its side chain was used where the thickness was made to about 500 to 800 Å by flexographic printing, and baked at 160 to 250 degree Celsius for 1 to 1.5 hours. Regarding rubbing treatment, the indentation amount was set to 0.3 to 0.8 mm and the direction was set to anti-parallel. Regarding the liquid crystal material, one having a dielectric anisotropy $\Delta\varepsilon$ of −4.4 and a refractive index anisotropy $\Delta n$ of approximately 0.13 was used.

Figure 7A:
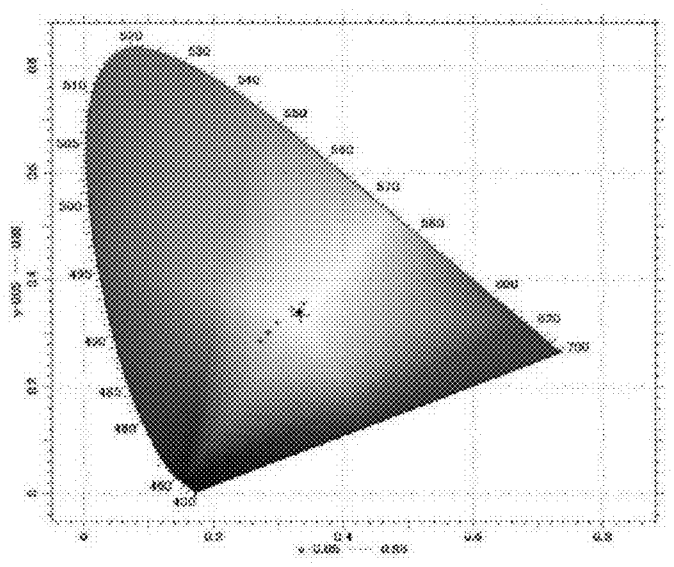
FIGS. 7A and 7B are diagrams showing changes in chromaticity of element a and element d, respectively.
Figure 7B:
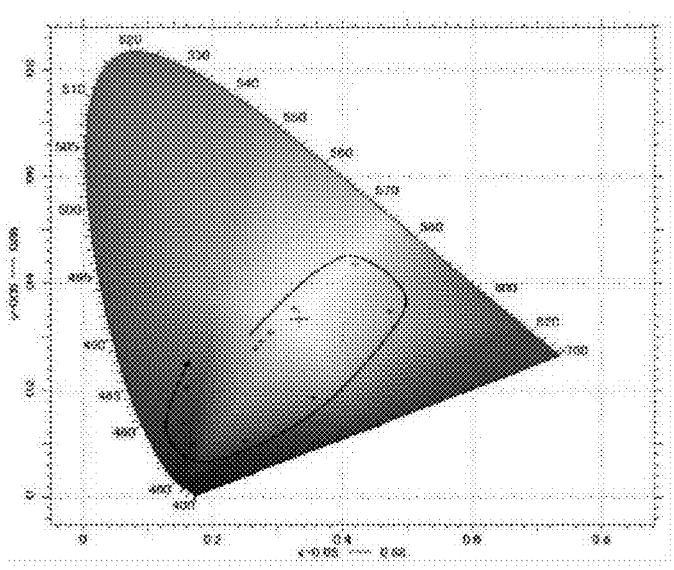

In FIG. 6, (a) characteristic line a indicates the characteristic of a liquid crystal element where the cell thickness is 6 μm and chiral material is added (hereinafter referred to as element a), (b) characteristic line b indicates the characteristic of a liquid crystal element where the cell thickness is 3 μm and chiral material is not added (hereinafter referred to as element b), (c) characteristic line c indicates the characteristic of a liquid crystal element where the cell thickness is 4 μm and chiral material is not added (hereinafter referred to as element c), and (d) characteristic line d indicates the characteristic of a liquid crystal element where the cell thickness is 6 μm and chiral material is not added (hereinafter referred to as element d). In element a and element b, the transmittance does not decrease and is substantially constant even when the applied voltage becomes high. On the other hand, in element c, the transmittance once increased as the applied voltage increases gradually decreases as the applied voltage further increases. Further, in element d, the transmittance is saturated at an applied voltage of about 3.8V, and the transmittance rapidly decreases as the voltage becomes higher than 3.8V. FIGS. 7A and 7B are diagrams showing changes in chromaticity of element a and element d, respectively. In element a, the chromaticity hardly changes irrespective of the voltage change, but in element d, the chromaticity changes largely. Here, element b also had a similar result as element a.

Here, in the liquid crystal element 5 of the present embodiment, the region in which voltage is applied from the respective pixel electrodes 14 (14*a*, 14*b*, 14*c*) to the liquid crystal layer 18 is defined as the "first region", and the region in which voltage is applied from the inter-pixel electrode 15 to the liquid crystal layer 18 is defined as the "second region". And the effective voltage applied to the liquid crystal layer 18 from the first region and the effective voltage applied to the liquid crystal layer 18 from the second region are different from each other. This is due to the difference in the presence or absence of the insulating layer 17. That is, in the second region, since the insulating layer 17 is interposed between the inter-pixel electrode 15 and the liquid crystal layer 18, the applied voltage is divided by the insulating layer 17 and the liquid crystal layer 18. Thus, as for the liquid crystal element 5, it is desirable to use element a or element b shown in FIG. 6 where the range in which the transmittance can be regarded as substantially constant with respect to the applied voltage is wider, and to set a relatively high applied voltage (for example, a voltage 1.5 times or more than a threshold value). Thereby, a necessary and sufficient voltage is applied to both the first region and the second region. The phrase "range in which the transmittance can be regarded as substantially constant" as referred to herein means a range where the transmittance variation falls within ±3%, for example. Thereby, it is possible to reduce G value which is the index indicating the gradient of the bright/dark boundary line (light intensity change).

Here, the G value is defined by the following equation (refer to Japanese Unexamined Patent Application Publication No. 2017-206094).

$$G=\mathrm{Log}(E_\beta - E_{\beta+0.1^\circ})$$

Here, $E_\beta$ is the light intensity value at the angular position β.

The G value, in the case of the prior art for example, is about 5.7 (when the distance between the pixel electrodes is 20 μm), but in the present embodiment, the G value can be made smaller. The G value is preferably 1 or less.

The difference in the effective applied voltages between the above-described first region and the second region will now be examined. The second region can be regarded as connecting the capacitance component of the liquid crystal layer 18 and the capacitance component of the insulating layer 17 in series. That is, the second region can be regarded as a series connection of two capacitors.

The capacitance component $C_{LC}$ of the liquid crystal layer 18 can be expressed as follows, where the dielectric constant (short axis direction) of the liquid crystal material is defined as $\varepsilon_{LC}$, the area of the region is defined as S, and the layer thickness of the liquid crystal layer 18 is defined as $d_{LC}$. Likewise, the capacitance component $C_{top}$ of the insulating layer 17 can be expressed as follows, where the dielectric constant of the insulating layer 17 is defined as $\varepsilon_{top}$, the area of the region is defined as S, and the layer thickness of the insulating layer 17 is defined as $d_{top}$.

$$C_{LC}=\varepsilon_{LC}\times S/d_{LC}$$

$$C_{top}=\varepsilon_{top}\times S/d_{top}$$

Since the capacitors are connected in series and the electric charge amount Q is the same between the two, the electric charge amount Q can be expressed as follows, where the voltage applied to the liquid crystal layer 18 is defined as $V_{LC}$ and the voltage applied to the insulating layer 17 is defined as $V_{top}$.

$$Q=C_{LC}\times V_{LC}$$

$$Q=C_{top}\times V_{top}$$

For example, in a liquid crystal element having a cell thickness of 6 μm, when $d_{LC}$ and $\varepsilon_{LC}$ of the liquid crystal layer 18 are 5 μm and 8.0, respectively, and $d_{top}$ and $\varepsilon_{top}$ of the insulating layer 17 are 1 μm and 3.44, respectively, each capacitance component is expressed as follows.

$$C_{LC}=8.0\times S/5=1.6\times S$$

$$C_{top}=3.44\times S/1=3.44\times S$$

Then, the following is derived.

$$V_{LC}:V_{top}=1/C_{LC}:1/C_{top}=1/1.6:1/3.44$$

Further, the following is derived.

$$V_{LC}:V_{top}=1.96:1$$

From the above numerical example, the divided voltage ratio of the liquid crystal layer 18 and the insulating layer 17 is 1.96:1 which is approximately 2:1. That is, since the insulating layer 17 does not exist in the first region where the voltage is applied to the liquid crystal layer 18 from each pixel electrode 14, the applied voltage basically remains unchanged. However, in the second region where the voltage is applied from the inter-pixel electrode 15, the voltage obtained by dividing the applied voltage by 2:1 is applied to the liquid crystal layer 18. Therefore, in order to prevent a difference in transmittance between the first region and the second region, as described above, it is desirable to use a liquid crystal element having a wide range in which the transmittance can be regarded as substantially constant for the liquid crystal element 5, and to apply a relatively high voltage. For example, when using the liquid crystal element of the characteristic line a (element a) shown in FIG. 6, if the applied voltage is set to 7 V, then 7 V is applied to the first region of the liquid crystal layer 18 and the divided voltage of about 4.7 V is applied to the second region, thereby similar transmittance can be obtained in both regions.

In other words, it is preferable to configure the liquid crystal element 5 so as to have a transmittance characteristic such that the transmittance due to the voltage divided by the insulating layer 17 and applied to the liquid crystal layer 18 and the transmittance due to the voltage without being divided by the insulating layer 17 and applied to the liquid crystal layer 18 are substantially equal (within a variation range of ±3%, for example).

Figure 8:
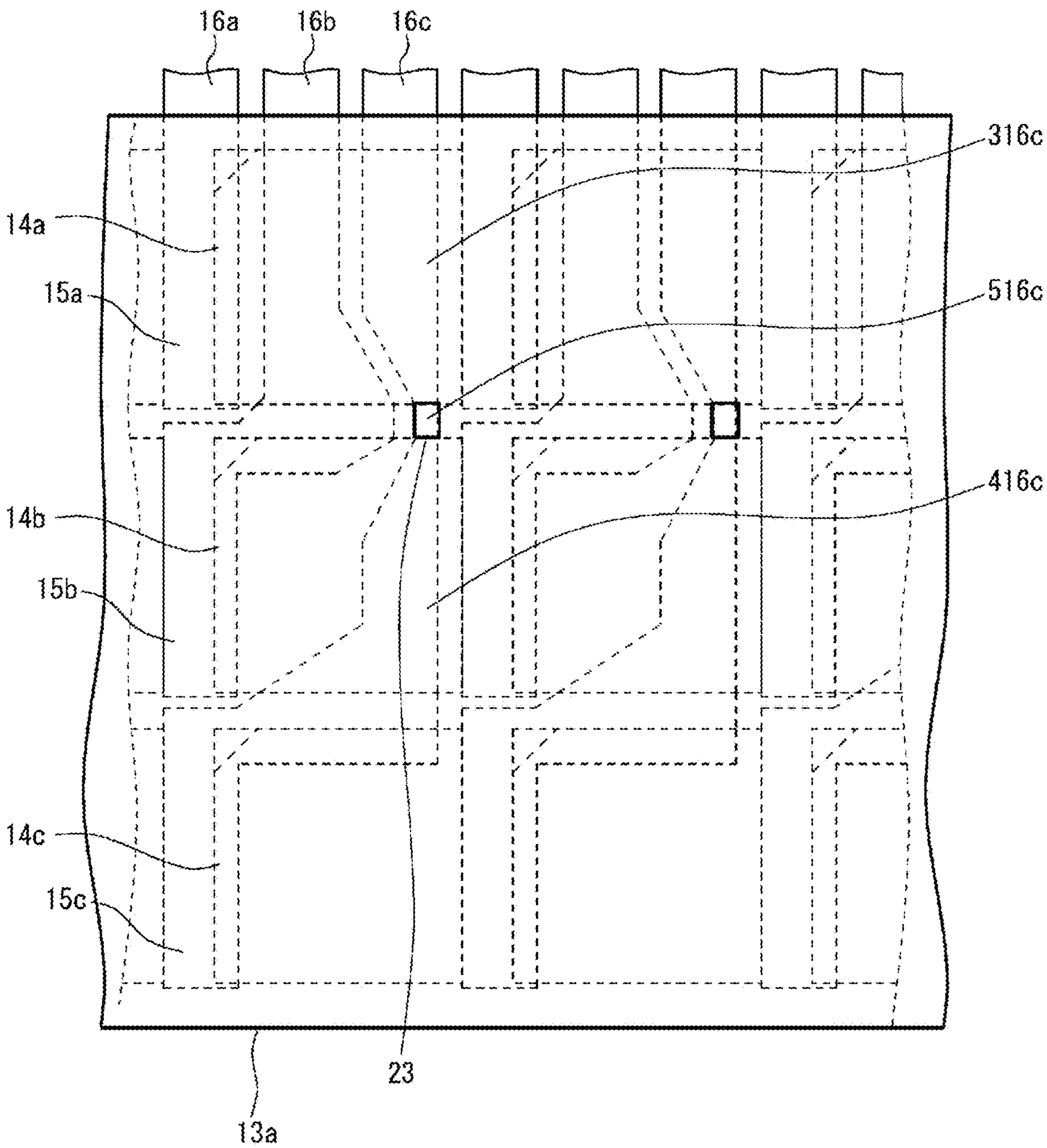
FIG. 8 is a plan view for explaining a modification example of the common electrode.

FIG. 8 is a plan view for explaining a modification example of the common electrode. In FIG. 8, the common electrode 13 is superimposed on each of the pixel electrodes 14*a*, etc. In the illustrated common electrode 13*a*, openings 23 are provided in regions corresponding to the connection regions 516*c* of the respective wiring parts 16*c*. Although it is preferable that the shape and size of the opening 23 in plan view be substantially similar to that of the connection region 516*c*, in consideration of manufacturing accuracy limitation and to allow some margin for positioning, the opening 23 may be made somewhat larger than the connection region 516*c* so that the connection region 516*c* is internally included in the opening 23 in plan view. By providing such openings 23, unnecessary light transmission in the connection regions 516*c* can be prevented.

Specifically, if each of the openings 23 is not provided, when voltage is applied to the pixel electrode 14*c* and the region is brought into a light transmitting state, since the same voltage is also applied to each of the connecting regions 516*c*, each of the connecting regions 516*c* also becomes a light transmitting state. Here, if each region corresponding to the pixel electrode 14*a* and the pixel electrode 14*b* is in a non-transmissive state (or a low transmissive state), then it is conceived that the light transmitting state of each of the connecting regions 516*c* can be visually recognized as a bright spot. Therefore, by providing the openings 23, occurrence of such bright spot can be avoided. Now, since the connection regions 516*c* are constantly in the non-transmissive state, each of the regions can be visually recognized as a black spot, but since a black spot is less conspicuous than a bright spot considering the characteristics of human eyes, it can be said that having black spots is more preferable than having bright spots. Further, as shown in the figure, since each connection region 516*c* exists for the purpose of electrically connecting the partial region 316*c* and the partial region 416*c*, it can be formed in a relatively small size. Therefore, it is possible to make the black spots hardly visible.

Figure 9:
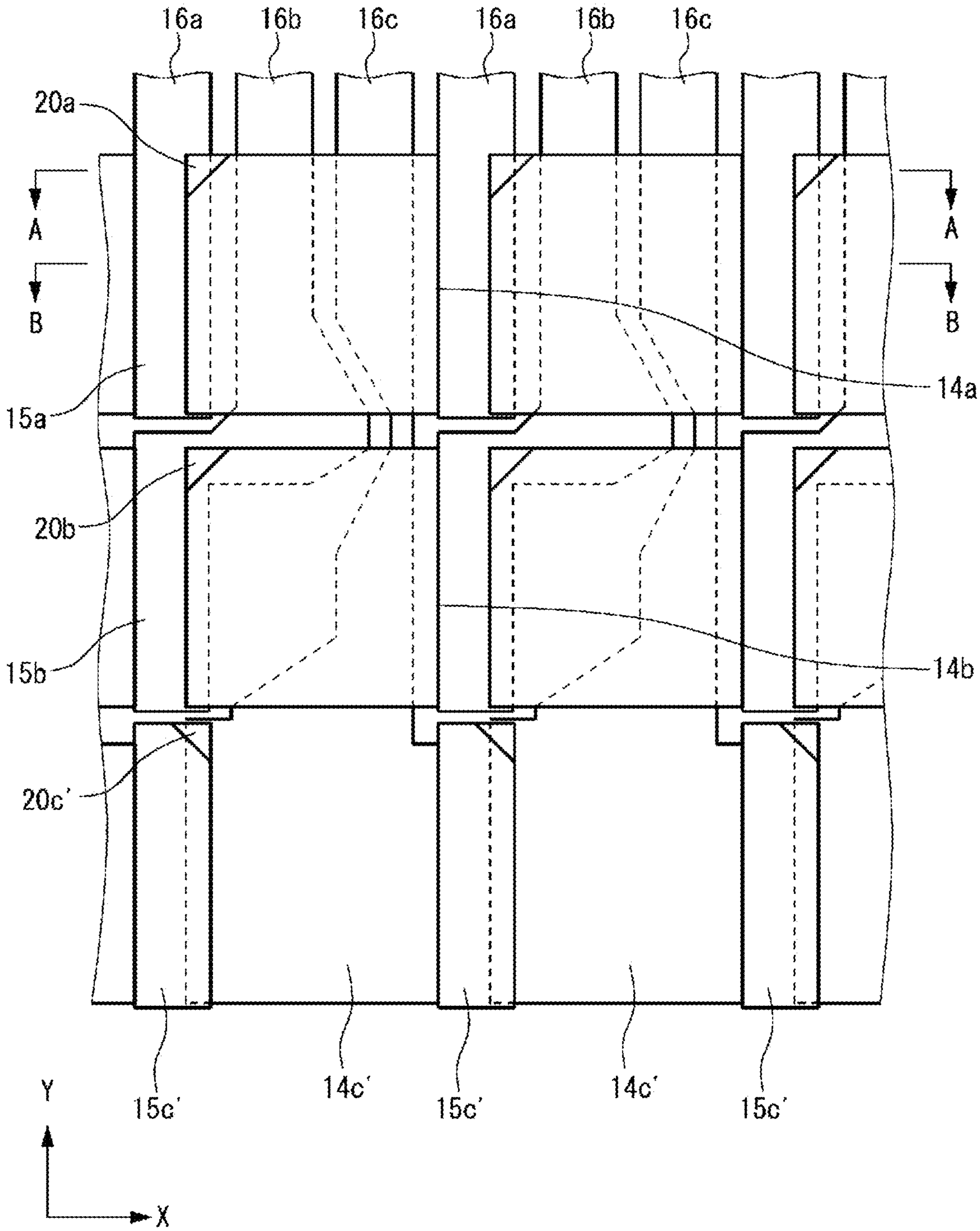
FIG. 9 is a plan view for explaining a modified embodiment of the pixel electrodes and the inter-pixel electrodes.

FIG. 9 is a plan view for explaining a modified embodiment of the pixel electrodes and the inter-pixel electrodes. In the illustrated example, in the third row, the vertical arrangement of the pixel electrodes and the inter-pixel electrodes is inverted, which is different from the above-described embodiment. Specifically, the pixel electrodes 14*c*' are provided on the lower layer side and the insulating layer 17 (refer to FIGS. 2A and 2B) is provided so as to cover them, and the inter-pixel electrodes 15*c*' are provided on the upper side of the insulating layer 17. Each inter-pixel electrode 15*c*' is provided with a connecting part 20*c*', and each inter-pixel electrode 15*c*' and each pixel electrode 14*c*' are connected via the connecting part 20*c*'. Each wiring part 16*c* is connected to each pixel electrode 14*c*'. As in this example, it is possible to invert the vertical arrangement of the pixel electrodes and the inter-pixel electrodes.

Figure 10:
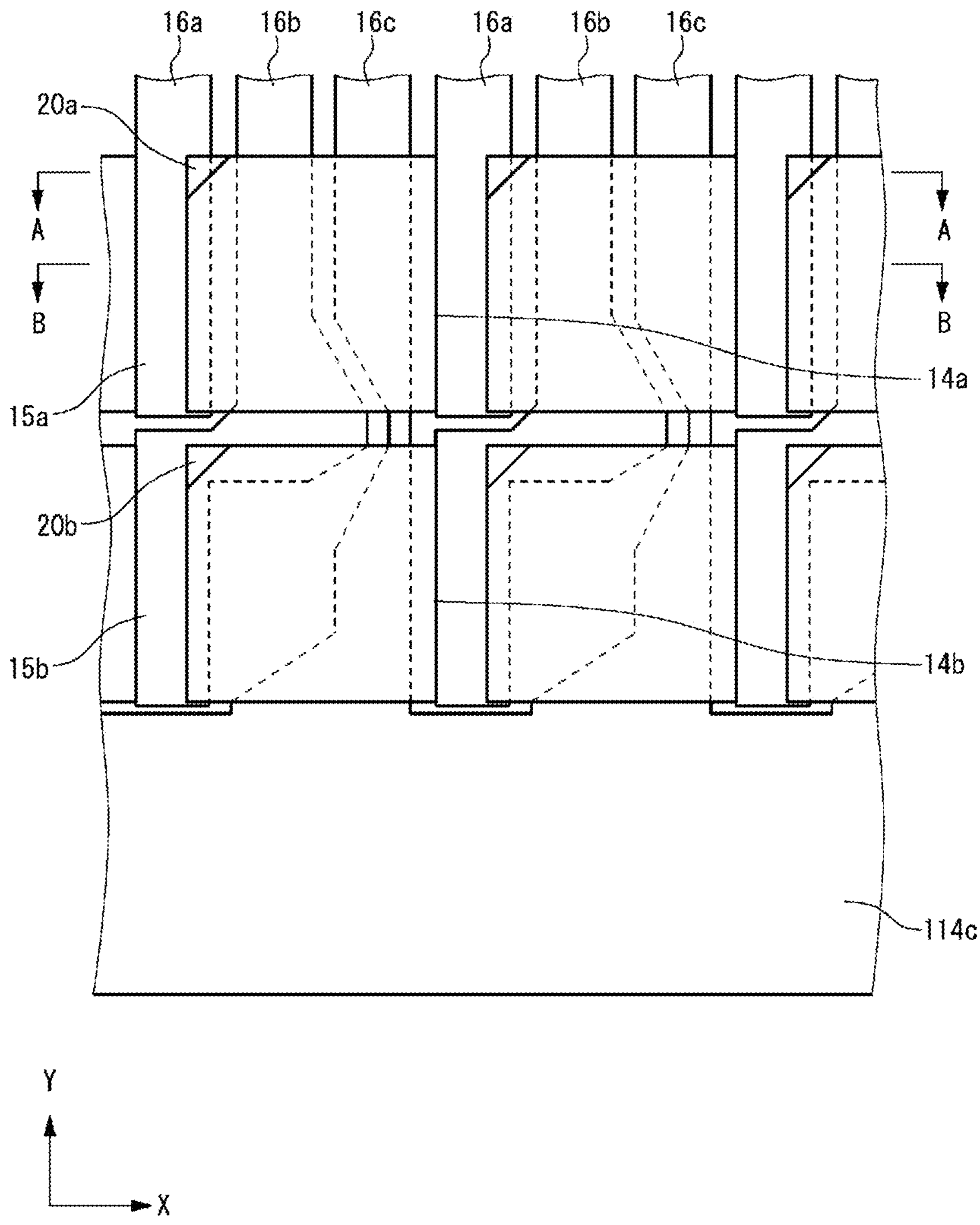
FIG. 10 is a plan view for explaining a modified embodiment of the pixel electrodes.

FIG. 10 is a plan view for explaining a modified embodiment of the pixel electrodes. In the illustrated example, in the third row, the pixel electrodes 114*c* are all integrated and provided below the insulating layer 17 which is different from the above-described embodiment. As in this example, a part of pixel electrodes may be integrated with the other. Here, although the illustrated example provides a plurality of wiring parts 16*c*, a minimum of one wiring part 16*c* connected to the pixel electrode 114*c* may be sufficient. Then, the region capable of functioning as a pixel region can be further expanded.

According to each of the embodiments as described above, it is possible to improve the appearance of a light distribution pattern in a vehicular lamp system that controls the light distribution pattern using liquid crystal elements or the like.

It should be noted that this invention is not limited to the subject matter of the foregoing embodiment, and can be implemented by being variously modified within the scope of the present invention as defined by the appended claims. For example, in the above-described embodiments, the liquid crystal layer of the liquid crystal element is described as being vertically aligned, but the configuration of the liquid crystal layer is not limited thereto, and other structures (for example, TN alignment) may be implemented. Further, a viewing angle compensating plate may be disposed between the liquid crystal element and the polarizer.

Further, the above-described embodiments refer to applying the present invention to a system that selectively irradiates light to the forward direction of a vehicle, but the scope of the present invention is not limited thereto. For example, the present invention may be applied to a system that irradiates light to the obliquely forward direction of the vehicle according to the traveling direction of the vehicle, or a system that adjusts the optical axis of the headlamp according to the inclination in the longitudinal direction of the vehicle, or a system that electronically adjusts the high beam and the low beam of the headlamp or the like. Furthermore, the present invention may be applied not only to vehicular applications but also to lighting apparatus in general.

What is claimed is:

1. A liquid crystal element comprising:

a first substrate and a second substrate disposed facing each other, and a liquid crystal layer disposed between the first substrate and the second substrate, wherein the first substrate has a counter electrode provided on one surface side thereof, wherein the second substrate has a plurality of inter-pixel electrodes and a plurality of wiring parts provided on one surface side thereof, an insulating layer provided above the plurality of inter-pixel electrodes and the plurality of wiring parts, and a plurality of pixel electrodes provided above the insulating layer, wherein the plurality of pixel electrodes are arranged along a first direction and a second direction intersecting the first direction in plan view, wherein each of the plurality of inter-pixel electrodes is arranged, in plan view, so as to at least overlap with a gap between two of the pixel electrodes that are adjacent to each other in the first direction among the plurality of pixel electrodes, and is connected to one of the two pixel electrodes through a through hole provided in the insulating layer, and wherein each of the plurality of wiring parts is connected to one of the plurality of inter-pixel electrodes and is arranged on a lower layer side with respect to the plurality of pixel electrodes.

2. The liquid crystal element according to claim 1, wherein each of the plurality of inter-pixel electrodes has a first region that overlaps with a part of the pixel electrode connected to the inter-pixel electrode, in a vicinity of an outer edge of the pixel electrode, in plan view.

3. The liquid crystal element according to claim 2, wherein each of some of the plurality of wiring parts has a second region that overlaps with a part of the pixel electrode connected via the wiring part and the inter-pixel electrode, in a vicinity of another outer edge of the pixel electrode, in plan view.

4. The liquid crystal element according to claim 2, wherein each of some of the plurality of wiring parts has a third region that overlaps with a gap between two of the pixel electrodes that are adjacent to each other in the second direction, in plan view.

5. The liquid crystal element according to claim 2, wherein each of some of the plurality of wiring parts has a connection region extended between two of the pixel electrodes that are adjacent to each other in the second direction, in plan view, and wherein the counter electrode has a plurality of openings overlapping with each of the connection regions, in plan view.

6. The liquid crystal element according to claim 2, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

7. A lighting apparatus capable of variably setting a light distribution pattern comprising:

a light source;

the liquid crystal element according to claim 2, for forming an image corresponding to the light distribution pattern using light from the light source, and an optical system for projecting the image formed by the liquid crystal element.

8. The liquid crystal element according to claim 1, wherein each of some of the plurality of wiring parts has a second region that overlaps with a part of the pixel electrode connected via the wiring part and the inter-pixel electrode, in a vicinity of an outer edge of the pixel electrode, in plan view.

9. The liquid crystal element according to claim 8, wherein each of some of the plurality of wiring parts has a third region that overlaps with a gap between two of the pixel electrodes that are adjacent to each other in the second direction, in plan view.

10. The liquid crystal element according to claim 8, wherein each of some of the plurality of wiring parts has a connection region extended between two of the pixel electrodes that are adjacent to each other in the second direction, in plan view, and wherein the counter electrode has a plurality of openings overlapping with each of the connection regions, in plan view.

11. The liquid crystal element according to claim 8, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

12. The liquid crystal element according to claim 1, wherein each of some of the plurality of wiring parts has a third region that overlaps with a gap between two of the pixel electrodes that are adjacent to each other in the second direction, in plan view.

13. The liquid crystal element according to claim 12, wherein each of said some of the plurality of wiring parts has a connection region extended between the two pixel electrodes adjacent to each other in the second direction, in plan view, and wherein the counter electrode has a plurality of openings overlapping with each of the connection regions, in plan view.

14. The liquid crystal element according to claim 13, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

15. The liquid crystal element according to claim 12, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

16. The liquid crystal element according to claim 1, wherein each of some of the plurality of wiring parts has a connection region extended between two of the pixel electrodes that are adjacent to each other in the second direction, in plan view, and wherein the counter electrode has a plurality of openings overlapping with each of the connection regions, in plan view.

17. The liquid crystal element according to claim 16, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

18. The liquid crystal element according to claim 1, wherein the through hole provided in the insulating layer has an outer edge which obliquely intersects with each of two outer edges of the pixel electrode, wherein the second substrate has a uniaxial alignment regulating force that controls alignment of the liquid crystal layer in one direction, and wherein the direction of the uniaxial alignment regulating force intersects with the outer edge of the through hole and is further set toward the outer edge of the through hole.

19. A lighting apparatus capable of variably setting a light distribution pattern comprising:

a light source;

the liquid crystal element according to claim 1, for forming an image corresponding to the light distribution pattern using light from the light source, and an optical system for projecting the image formed by the liquid crystal element.

* * * * *